United States Patent
Appajanna et al.

(10) Patent No.: US 10,958,757 B2
(45) Date of Patent: Mar. 23, 2021

(54) MICROSERVICES REQUEST FLOW CONTROL SYNCHRONIZATION

(71) Applicant: International Business Machines Corporation, Armonk, NY (US)

(72) Inventors: Vinod Appajanna, Bangalore (IN); Vittal Ramakanth Pai, Bangalore (IN); Badekila Ganesh Prashanth Bhat, Bangalore (IN); Srinivasan Nanduri, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/195,716

(22) Filed: Nov. 19, 2018

(65) Prior Publication Data

US 2020/0162578 A1    May 21, 2020

(51) Int. Cl.
G06F 15/173    (2006.01)
H04L 29/08    (2006.01)

(52) U.S. Cl.
CPC .............. *H04L 67/32* (2013.01); *H04L 67/10* (2013.01)

(58) Field of Classification Search
CPC ......... H04L 67/16; H04L 67/32; H04L 63/12; H04L 63/123
See application file for complete search history.

(56) References Cited

U.S. PATENT DOCUMENTS

| | | | |
|---|---|---|---|
| 10,212,041 B1 * | 2/2019 | Rastogi | ................. H04L 41/12 |
| 10,348,858 B2 | 7/2019 | Theebaprakasam et al. | |
| 2004/0003087 A1 * | 1/2004 | Chambliss | .......... G06F 11/1076 709/226 |
| 2015/0058474 A1 | 2/2015 | Bloom et al. | |
| 2015/0156123 A1 | 6/2015 | Xiao et al. | |
| 2017/0093961 A1 | 3/2017 | Pacella et al. | |
| 2017/0279910 A1 | 9/2017 | Maria | |
| 2020/0050494 A1 | 2/2020 | Bartfai-Walcott et al. | |

OTHER PUBLICATIONS

Chris Phillips, Go full throttle: The essentials to throttling in your application architecture, IBM Developer Website, May 31, 2017, pp. 1-11, IBM Corporation, Published at: https://www.ibm.com/developerworks/library/mw-1705-phillips/index.html.

Roberto Picanco, A Simple Way to Implement Rate Limiting, DZone Integration Website, Mar. 12, 2018, pp. 1-3, Published at: https://dzone.com/articles/a-simple-way-to-implement-rate-limiting.

* cited by examiner

Primary Examiner — Yves Dalencourt
(74) Attorney, Agent, or Firm — Christopher M. Pignato

(57) ABSTRACT

A set of requests for a shared dependent service are generated by a first cmicroservice of a set of collaborating microservices. A microservice request data set is received from request flow controller modules of other microservices of the set of collaborating microservices. The microservice request data set includes information indicative of requests to the shared dependent service made by the other collaborating microservices. A request flow controller module of the first microservice of the set of collaborating microservices synchronizes between the requests generated by the first microservice, and the requests indicated in the microservice request data set. The synchronized requests from the set of collaborating microservices to the shared dependent service are maintained according to processing capabilities of the shared dependent service.

20 Claims, 7 Drawing Sheets

MICROSERVICES REQUEST FLOW CONTROL SYNCHRONIZATION

BACKGROUND

The present invention relates to provision of cloud services and more particularly to provision of cloud services where multiple requesting microservices share a dependent service.

There is no industry consensus yet regarding the properties of microservices, and an official definition is missing as well. For purposes of this document, a "microservice" is defined as set of code that includes instructions and data for performing a computational function (called a "service") in a manner so that: (i) the microservice can be used with other microservices to make applications in the form of collections of loosely coupled services; (ii) the service provided by the microservice is fine-grained; and (iii) the protocols of the microservice are lightweight.

Some other possible characteristics of microservices may include one, or more, of the following (herein collectively referred to as the "Twenty Possible Microservices Characteristics"): (i) services in a microservice architecture (MSA) are often processes that communicate over a network to fulfill a goal using technology-agnostic protocols (herein referred to as "network-communicative microservices"); (ii) microservices respectively provide services that are independently deployable (herein referred to as "independently deployable microservices"); (iii) the services are easy to replace (herein referred to as "easily replaceable microservices"); (iv) services are organized around capabilities (for example, user interface front-end, recommendation, logistics, billing, etc.) (herein referred to as "capability-centric microservices"); (v) services can be implemented using different programming languages, databases, hardware and software environments, depending on what fits best (herein referred to as "generically-implementable microservices"); (vi) messaging enabled; (vii) bounded by contexts; (viii) autonomously developed; (ix) decentralized; (x) built and released with automated processes (herein referred to as "automated microservices"); (xi) naturally enforces a modular structure; (xii) lends itself to a continuous delivery software development process; (xiii) a change to a small part of the application only requires rebuilding and redeploying only one or a small number of services; (xiv) adheres to principles of business-driven development (for example, domain-driven design); (xv) uses IDEAL cloud application architectures; (xvi) uses polyglot programming and persistence; (xvii) uses lightweight container deployment; (xviii) exhibits decentralized continuous delivery; (xix) uses DevOps with holistic service monitoring; and/or (xx) provides characteristics that are beneficial to scalability.

It is known that there may be dependencies among and/or between microservices. Dependencies are any type of coupling among and/or between software modules. Dependencies include, but are not necessarily limited to, the following types (herein collectively referred to as "Eleven Possible Dependency Types"): (i) "low" (also "loose" and "weak"); (ii) "high" (also "tight" and "strong"); (iii) procedural programming type; (iv) content coupling; (v) common coupling; (vi) external coupling; (vii) control coupling; (viii) stamp coupling (also referred to as data-structured coupling); (ix) data coupling; (x) subclass coupling; and/or (xi) temporal coupling.

Cloud computing has evolved to allow previously-developed services that are available within the cloud to be reused and integrated to create new services. Certain patterns of development have emerged in cloud computing, and integration of microservices is one such pattern.

SUMMARY

A computer-implemented method includes, by a processor that executes a request flow controller module of a first microservice of a set of collaborating microservices; generating, by the first microservice, a plurality of requests for a shared dependent service; receiving, from request flow controller modules of other microservices of the set of collaborating microservices, a microservice request data set including information indicative of requests to the shared dependent service made by the other collaborating microservices; synchronizing, by the request flow controller module of the first microservice, between: (i) the requests generated by the first microservice, and (ii) the requests indicated in the microservice request data set; and maintaining the synchronized requests from the set of collaborating microservices to the shared dependent service according to processing capabilities of the shared dependent service.

A system that performs the computer-implemented method and a computer program product that causes a computer to perform the computer-implemented method are also described.

DETAILED DESCRIPTION

Figure 1:
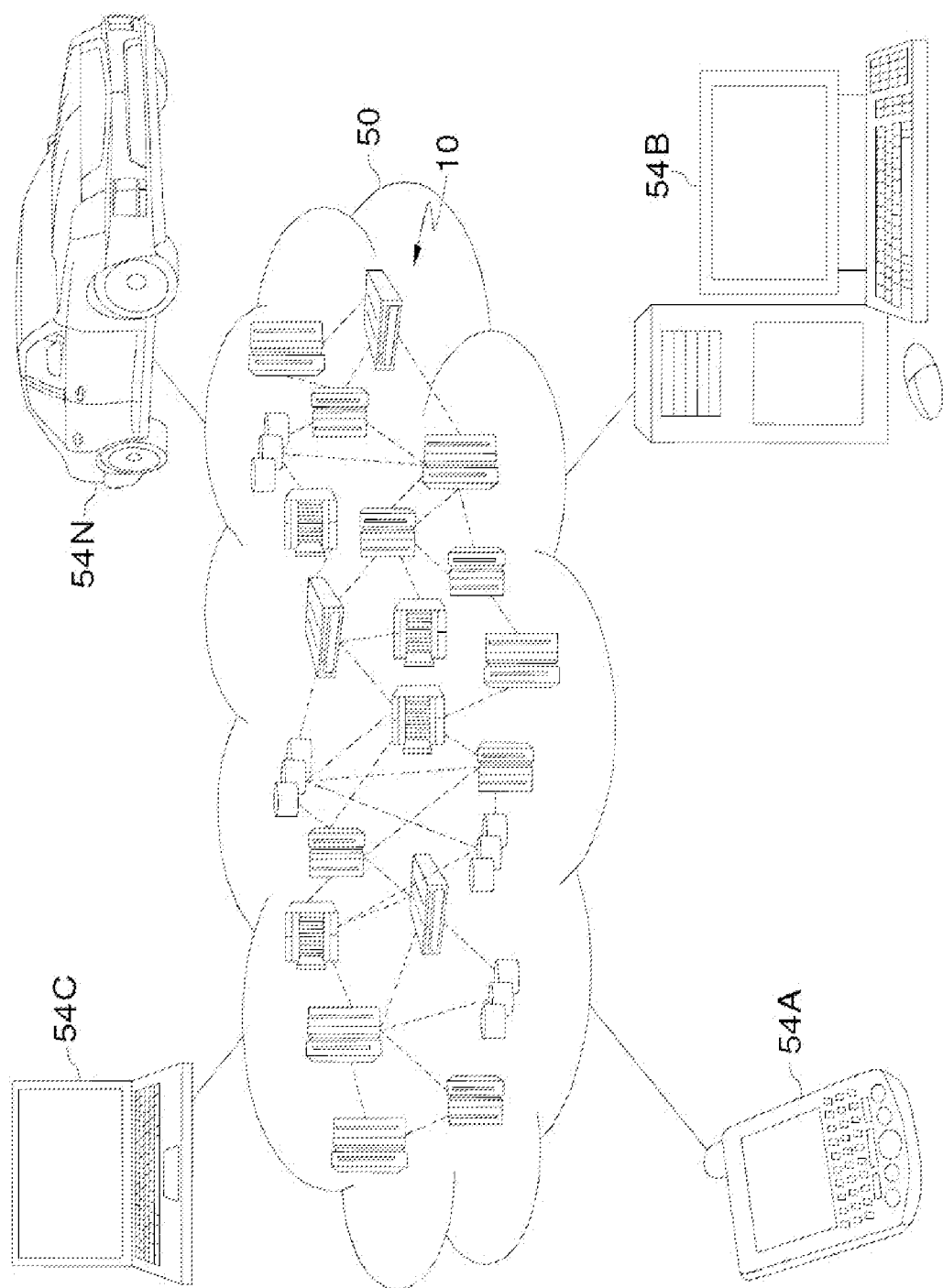
FIG. 1 depicts a cloud computing environment according to an embodiment of the present invention.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides collaborative microservices request flow control synchronization. The present technology solves a recognized cloud-based microservices deployment and integration problem that previously resulted in lost/blocked messages by providing technology that includes a new form of request issuance-side synchronization among sets of microservices that utilize a same shared dependent service to transmit service-related messages (e.g., push notifications). In contrast to conventional multiple-microservices request issuance that resulted in many more requests than could be processed by the shared dependent service, and thereby blocking of all requests that exceeded to processing-level capabilities of the shared dependent service, the request issuance-side synchronization described herein maps request levels among a set of microservices in a synchronized manner down to the processing-level capabilities of the shared dependent service. By ensuring that the shared dependent service is not presented with service requests that are in excess of the processing-level capabilities of the shared dependent service, the shared dependent service does not block any service requests from the multiple microservices that share the dependent service. As such, the technology described herein improves computational processing and integrated services request throughput within complex cloud-based computing environments by preventing blocking of service requests from multiple microservices that share a dependent service.

Some terminology used in describing some embodiments of the present invention will now be explained. The term "quality of service" (QoS) is hereby defined as specified processing capabilities of a shared dependent service. The QoS represents a threshold of service functionality that is expected of and/or promised to be provided by a particular component or system when operating in a service provider capacity, such as a threshold level or time-based measure of event processing, message processing, and/or throughput processing capabilities (e.g., requests per second, data volume per request, etc.). A service provider may promise a particular service-level QoS to a service consumer based on a price charged for a particular service and/or a specific sub-plan in the service, and computer infrastructure may be allocated to fulfill (but not exceed) the stated QoS. Microservices may be autonomously integrated and changed over time to both fulfill and consume QoS obligations as those obligations change over time. As a further result, service provider QoS obligations may be distributed and fulfilled within a complex cloud computing system by multiple integrated microservices, or may be fulfilled by a single microservice of another service component (e.g., a database service, etc.). Additionally, service-consumer microservices may be integrated within a complex cloud computing system to share and consume dependent services (e.g., share a database service, etc.).

A "microservice" is hereby defined as a compartmentalized independent service-based application that provides one or more specific services and that is capable of being deployed to provide the respective service(s) within a cloud computing environment. To facilitate cloud service development using microservices, a group of interdependent microservices are designed to have low coupling across components. Each microservice can be built, updated, managed, scaled, and even replaced as and when appropriate/needed (e.g., for service enhancements, etc.) without affecting other collaborating microservices of the cloud service. A microservice as defined herein further includes a published interface definition that defines an operative interface provided by and/or expected by the microservice (e.g., inputs, outputs, services description(s), dependencies on other microservices and/or infrastructure, and other interface elements), and that facilitates the low coupling across components. A microservice as defined herein can further be integrated and deployed rapidly with other microservices to provide combined services without redesign or programming intervention, and as a result can be deployed in an automated manner by coupling the respective operative interfaces according to published operative interface definitions of the respective integrated microservices. Each microservice is designed to provide a fixed quality of service (QoS) when deployed, and can be dependent on other cloud services (e.g., a database) or other micro services as specified in the respective operative interface definitions to provide the specified service(s) at the specified QoS. As a result of the fixed QoS provided by microservices, microservices are designed to be stateless, such that all required data used by the microservice is saved in a data store (e.g., a database).

A "push" notification service is an example of a mobile device-based service that allows notifications to be sent to mobile applications, and thereby to mobile devices that have the mobile applications installed. A push notification service has a QoS that may be specified as a number of notifications that are either time or volume based. As such, a push notification service has a QoS based on a fixed number of push notifications purchased by a customer. The technology described herein relates to technological improvements in ensuring delivery of push notifications according to technological requirements specified by the QoS of the particular service, and is not directed to how to establish a particular QoS according to service offerings of a particular service provider (i.e., is not related to costs, service plans, or any other business-related aspects). The technology described herein is directed to preventing request/message loss at the computational level, and as a result is directed to computer processing and request throughput improvements).

An "atomic" variable is a storage element that can be accessed by multiple different processes, but that can only be modified by one process at a time. Whenever a modification to an atomic variable has occurred, all of the processes accessing the atomic variable get the modified value. Atomic variables are utilized as described herein to synchronize operations by/among multiple collaborating microservices and to ensure that queries/requests to a shared dependent service do not exceed the processing capabilities (e.g., QoS) of the shared dependent service.

The phrases "microservices request flow control synchronization" and "collaborative microservices request flow control synchronization" are used interchangeably herein, and are defined herein to represent integration of microservices in a collaborative manner that, as described in detail herein, allows each microservice to contribute to regulating shared dependent service requests as a group of microservices, such that a QoS of the shared dependent service is not overwhelmed with requests from the group of microservices. The microservices request flow control synchronization, as described in detail herein, ensures collaborative compliance among multiple microservices within dependent service QoS limits, such that requests issued to the shared dependent services are not lost. As such, the technology described herein differs from "throttling" and other conventional service-side technologies that restrict or block requests at a service provider if the requests accidentally or maliciously exceed a designed QoS level of the particular service provider. In contrast to such conventional technologies, the technology described herein operates by integration of a set of multiple microservices that together collaboratively control issuance of request flows from the set of microservices "to" the service provider based upon awareness of the QoS limitations/capabilities of the service provider. The microservices collaborate to synchronize their collective requests to the QoS of the shared dependent service. Accordingly, the technology described herein is fundamentally different from conventional types of service provider-side integration technologies.

The technology described herein operates by a processor that executes a request flow controller module of a first microservice of a set of collaborating microservices. The processor generates, by the first microservice, a set of requests for a shared dependent service. The processor receives, from request flow controller modules of other microservices of the set of collaborating microservices, a microservice request data set including information indicative of requests to the shared dependent service made by the other collaborating microservices. The processor synchronizes, by the request flow controller module of the first microservice, between the requests generated by the first microservice, and the requests indicated in the microservice request data set. The processor maintains the synchronized requests from the set of collaborating microservices to the shared dependent service according to processing capabilities of the shared dependent service.

It should be noted that conception of the present subject matter resulted from recognition of certain limitations associated with microservices integration within complex cloud computing systems. It was observed that microservices, when deployed and integrated within a cloud computing environment, depend upon and issue requests to other cloud and backend services (e.g., database services, message queues, etc.). Within this dependency relationship of cloud computing, these microservices and other cloud services upon which requesting microservices depend are each designed to provide a fixed quality of service (QoS) to ensure ease of deployment and integration with other such services. However, it was observed that a requesting service and a dependent service upon which the requesting service depends may have different configured QoS provisions that are specified according to how the different services are designed and used. For example, a push notification service may specify a QoS as a fixed number of requests, irrespective of when those requests are sent, and the number of notifications can potentially all be sent in one set. In contrast, a database service has a different QoS metric, such as a fixed plan where the requests are limited in terms of numbers of requests per second (e.g., fifteen (15) requests/second, etc.). It was further observed that certain types of requests (e.g., database queries, push notifications, etc.) that are either generated by or required to be processed by microservices or other cloud services are asynchronous and bursty in nature.

Additionally, taking a push notification for purposes of example, a single push notification may be required to be transmitted to millions of devices, such as where devices with a particular mobile application (app) are designated to each receive the same push notification. Continuing with this observation, if five (5) million devices have a mobile application installed, and as a result are designated to each receive a push notification with a message issued by the mobile application provider, then five (5) million backend database reads would be needed to extract stored device identifiers (IDs) for all of the mobile devices that have the mobile application installed. Further, push notifications must be sent through the mobile device service provider gateway by transmission of the respective device ID and notification message for each push notification. As a result, it was observed that processing of these types of high-volume and bursty requests can repeatedly exceed the fixed QoS design of the database service. It was further observed that when the fixed QoS of the dependent service is exceeded, the dependent service is conventionally designed to block any additional requests (at the service provider side) and all excess requests are lost, which results in data loss and/or reduced processing speed at both a sending service and the dependent service due to the additional processing required to resend and process the lost requests.

From these observations, it was determined that the problem of blocked requests is further increased where multiple microservices share the same dependent service and need to send requests to the same shared dependent service. The problem of blocked requests is further complicated when the shared dependent service has a different/lower QoS from the requesting microservices. In such circumstances, any requests generated by the multiple microservices that are in excess of the lower QoS of the dependent service will be lost by conventional cloud computing technologies.

It was determined that there is no conventional approach by which to map asynchronous and bursty request levels (at the service requester side) to a lower fixed QoS of a dependent service provider, particularly across multiple requesting microservices. Additionally, it was determined that within cascaded microservices integrations, throughput across the group of cascaded microservices is limited by the lowest QoS among all of the microservices, and that as a result QoS mis-matches cascade to create multiple points of request failures/blocking and request losses/inefficiency of computer processing.

The present technology solves these recognized microservices integration and quality of service (QoS) problems by providing technology that includes a new form of request flow control synchronization among multiple microservices that share a dependent service within complex cloud computing environments. For example, a database service or a message queuing service may have a lowest QoS or may be a most shared/most used service among a set of microservices. The technology described herein provides a front-end request issuance service that synchronizes requests to the database and/or message queuing service across all microservices that use the respective dependent service(s). The cross-microservices synchronized requests are issued in batches from the set of microservices that share the respective dependent service(s), such that throughput efficiency is improved with minimal additional processing overhead in the request flow path. Accordingly, the technology described herein provides a method to handle asynchronous/bursty requests in a cloud service, while avoiding the failures associated with conventional approaches to microservices design. The technology described herein solves these problems by controlling, on the microservices (request source) side, the issuance of requests to the dependent services in such a way as to conform to the QoS limits of the dependent services, thereby offloading processing at the shared dependent service that would otherwise be consumed to throttle the excess flow of requests at the dependent service, and thereby ensuring that the service provider is unaffected and operates efficiently.

As such, the technology described herein improves processing throughput capabilities across multiple microservices within cloud computing platforms, while preventing loss of requests that would otherwise occur by use of conventional technologies. The technology described herein further guarantees delivery of messages that would be lost by prior computing platforms. The technology described herein prevents loss of push notifications, even in bursty conditions, without requiring changes to the backend/dependent database service by providing collaborative microservices request flow control synchronization to a shared dependent service that has a different (e.g., lower) quality of service (QoS). By use of the technology described herein to control the synchronization processing within/between the microservices, processing capabilities are improved at the shared dependent service. Additionally, by adding collaborating microservices that share the same dependent service, source-side processing resource efficiency is improved because the source-side processing is distributed across computing devices that host the set of microservices and, as a result, each computing resource involved can operate at a lower microprocessor occupancy (i.e., lower cycles consumer) and the source-side processing thereby operates at a faster and with a higher request throughput efficiency. Accordingly, the technology described herein improves cloud computing capabilities by improving microservices integration, request issuance processing capabilities, request processing speed, request processing accuracy, and other improvements as described in more detail below.

Regarding the technical implementation details, each microservice that participates in the collaborative microservices request flow control synchronization includes a new module called a "request flow controller." The request flow controller synchronizes the issuance of requests across all of the microservices to the shared dependent service in a distributed and collaborative manner. The request flow controller and its operations will be described in more detail further below following description of certain hardware platforms upon which the technology may be implemented.

As described in detail below, the present subject matter improves cloud computing services by collaboratively synchronizing request flows across multiple microservices to meet a quality of service (QoS) of the dependent service, as described above and in more detail below. As such, improved notification throughput may be obtained by use of the present technology.

The collaborative micro services request flow control synchronization described herein may be performed in real time to allow prompt synchronization of dependent service requests across multiple microservices. For purposes of the present description, real time shall include any time frame of sufficiently short duration as to provide reasonable response time for information processing acceptable to achieve the results provided by the subject matter described. Additionally, the term "real time" shall include what is commonly termed "near real time"—generally meaning any time frame of sufficiently short duration as to provide reasonable response time for on-demand information processing acceptable to rapidly perform the results provided by the subject matter described (e.g., within a portion of a second or within a few seconds). These terms, while difficult to precisely define are well understood by those skilled in the art.

Additional details of the algorithmic processing and computational efficiencies will be provided further below. The following portion of the present description provides examples of advanced computational platform(s) within which the present technology may be implemented, followed by further details of the collaborative microservices request flow control synchronization described herein.

It should be noted that the present technology may be implemented within or as part of a cloud computing environment (e.g., for data analytics), or may be implemented as a customized environment-specific solution. As such, examples of implementations for both environments are included herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
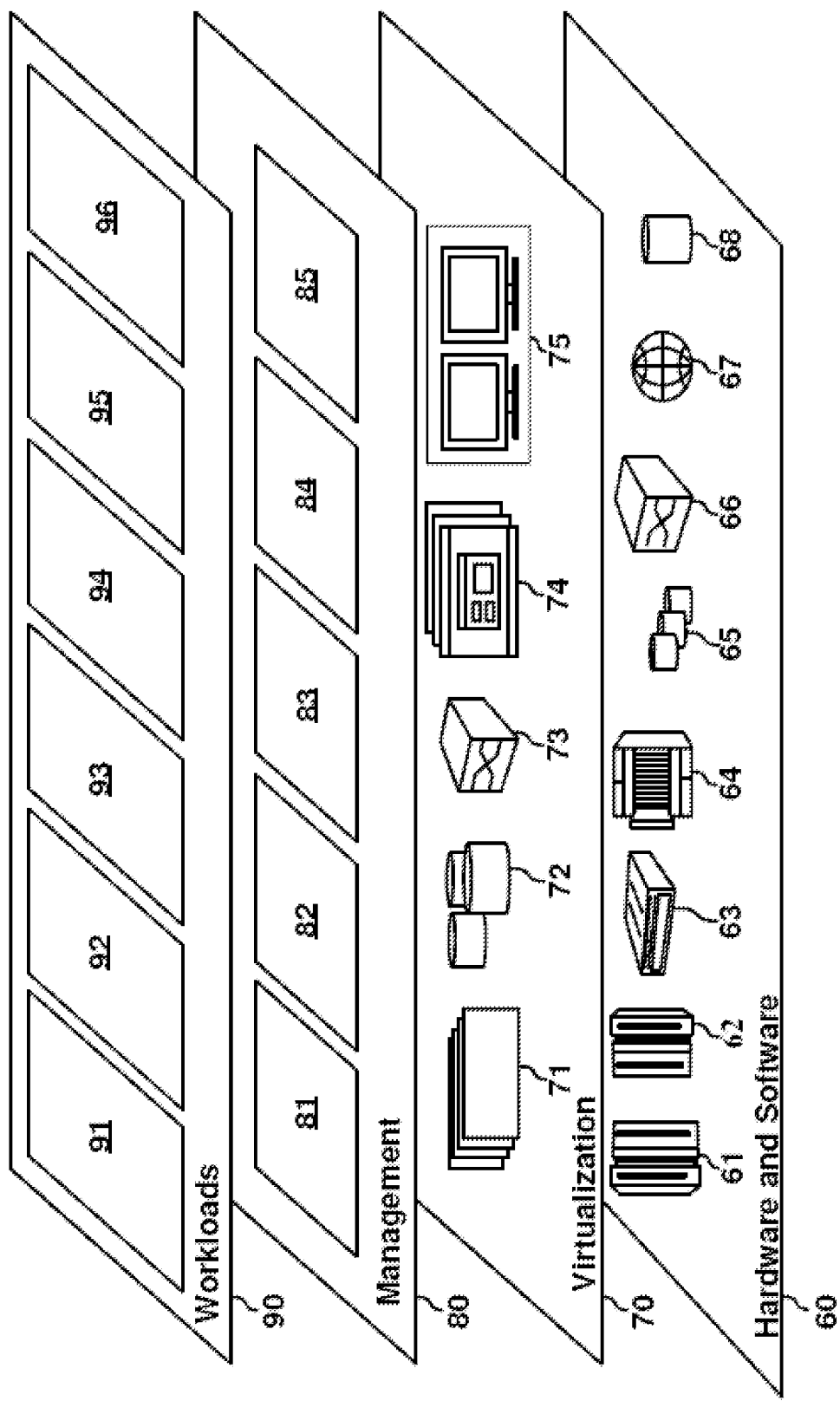
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and collaborative microservices request flow control synchronization 96.

Regarding alternative platform implementation options, FIGS. 3 and 4 below are directed to such alternatives. It should be understood that the various alternatives may be combined with or substituted with the implementation options described above and below, as appropriate for the given implementation.

Figure 3:
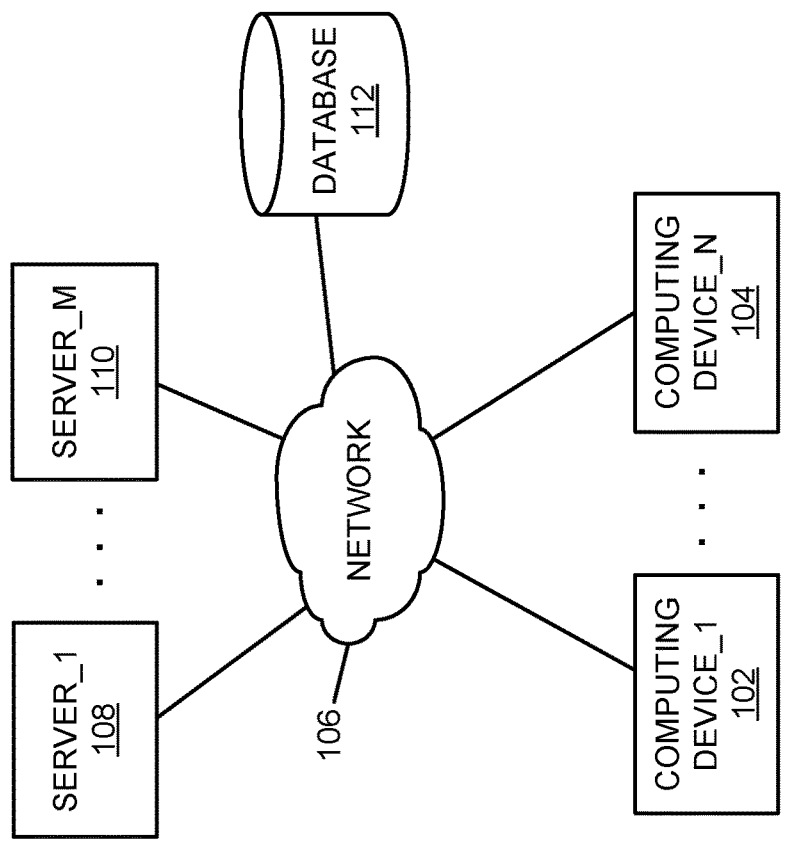
FIG. 3 is a block diagram of an example of an implementation of a system for collaborative microservices request flow control synchronization according to an embodiment of the present subject matter.

FIG. 3 is a block diagram of an example of an implementation of a system 100 for collaborative microservices request flow control synchronization. A computing device_1 102 through a computing device_N 104 communicate via a network 106 with several other devices. The other devices include a server_1 108 through a server_M 110, and a database 112.

As will be described in more detail below in association with FIG. 4 through FIG. 7, the devices within the system 100 provide automated collaborative microservices request flow control synchronization. The automated collaborative microservices request flow control synchronization is based upon request-side synchronization among multiple microservices that share a dependent service, such as the database 112.

In view of the implementation alternatives described above, the present technology may be implemented within a cloud computing platform, at a user computing device, at a server device level, or by a combination of such platforms and devices as appropriate for a given implementation. A variety of possibilities exist for implementation of the present subject matter, and all such possibilities are considered within the scope of the present subject matter.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The server_1 108 through the server_M 110 may include any device capable of providing data for consumption by a device, such as the computing device_1 102 through the computing device_N 104, via a network, such as the network 106. As such, the server_1 108 through the server_M 110 may each include a web server, application server, or other data server device.

The database 112 may include a relational database, an object database, or any other storage type of device. As such, the database 112 may be implemented as appropriate for a given implementation.

Figure 4:
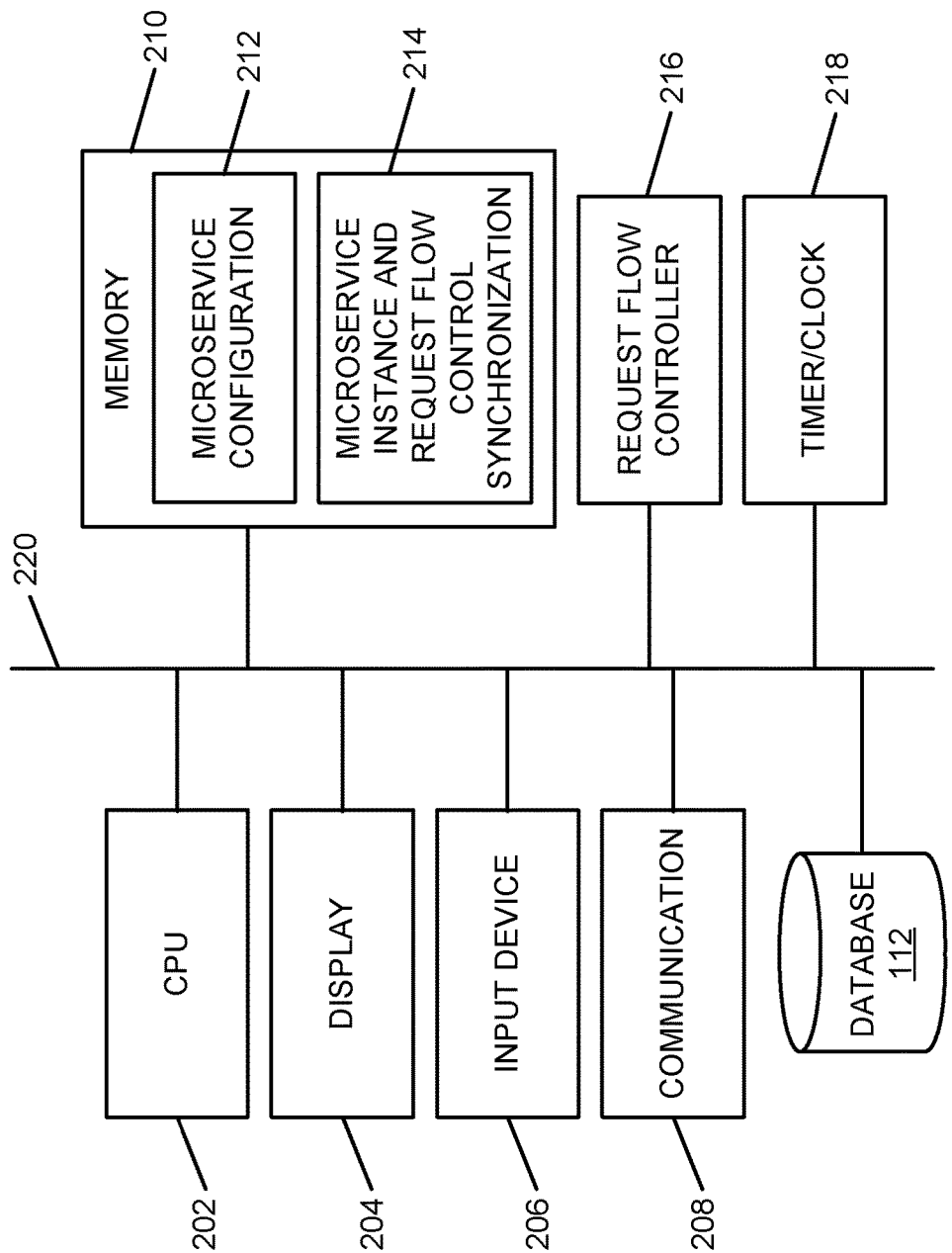
FIG. 4 is a block diagram of an example of an implementation of a core processing module capable of performing collaborative microservices request flow control synchronization according to an embodiment of the present subject matter.

FIG. 4 is a block diagram of an example of an implementation of a core processing module 200 capable of performing collaborative microservices request flow control synchronization. The core processing module 200 may be associated with either the computing device_1 102 through the computing device_N 104 or with the server_1 108 through the server_M 110, or with devices within the cloud computing environment 50, as appropriate for a given implementation. As such, the core processing module 200 is described generally herein, though it is understood that many variations on implementation of the components within the core processing module 200 are possible and all such variations are within the scope of the present subject matter. Further, the core processing module 200 may be implemented as an embedded processing device with circuitry designed specifically to perform the processing described herein as appropriate for a given implementation.

Further, the core processing module 200 may provide different and complementary processing of collaborative microservices request flow control synchronization in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 ("processor" or "application-specific" processor) provides hardware that performs computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, voice command processing unit, or any other type of input device by which the user may interact with and respond to information on the display 204.

It should be noted that the display 204 and the input device 206 may be optional components for the core processing module 200 for certain implementations/devices, or may be located remotely from the respective devices and hosted by another computing device that is in communication with the respective devices. Accordingly, the core processing module 200 may operate as a completely automated embedded device without direct user configurability or feedback. However, the core processing module 200 may also provide user feedback and configurability via the display 204 and the input device 206, respectively, as appropriate for a given implementation.

A communication module 208 provides hardware, protocol stack processing, and interconnection capabilities that allow the core processing module 200 to communicate with other modules within the system 100, or within the cloud computing environment 50, as appropriate for a given implementation. The communication module 208 may include any electrical, protocol, and protocol conversion capabilities useable to provide interconnection capabilities, as appropriate for a given implementation. As such, the communication module 208 represents a communication device capable of carrying out communications with other devices. The communication module 208 may further include one or more wireless communication capabilities, as appropriate for the given implementation.

A memory 210 includes a microservice configuration storage area 212 that stores microservice code images, operative interface(s) provided by and/or expected by a microservice (e.g., inputs, outputs, services description(s), dependencies on other microservices and/or infrastructure, and other interface elements), microservice confuration information including QoS, and other related information within the core processing module 200. It is understood that the microservice code images also include a request flow controller module that synchronizes with other microservices to map request levels from the set of microservices to the processing-level capabilities of any shared dependent service(s).

The memory 210 also includes a microservice instance and request flow control synchronization area 214 that stores executable microservice instances that include the request flow controller module. The microservice instance and request flow control synchronization area 214 also stores request synchronization information usable in collaboration with other executing microservices to map request levels from the set of microservices to the processing-level capabilities of any shared dependent service(s).

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A request flow controller module 216 is also illustrated. The request flow controller module 216 provides an embedded hardware/processing platform upon which to implement the collaborative microservices request flow control synchronization within the core processing module 200, as described above and in more detail below. The request flow controller module 216 implements the automated collaborative microservices request flow control synchronization of the core processing module 200.

It should also be noted that the request flow controller module 216 may form a portion of other circuitry described without departure from the scope of the present subject matter. The request flow controller module 216 may form a portion of an interrupt service routine (ISR), a portion of an operating system, or a portion of an application without departure from the scope of the present subject matter. The request flow controller module 216 may also include an embedded device with circuitry designed specifically to perform the processing described herein as appropriate for a given implementation.

A timer/clock module 218 is illustrated and used to determine timing and date information, such as real-time measurements usable to synchronize requests among multiple microservices to a shared dependent service, as described above and in more detail below. As such, the request flow controller module 216 may utilize information derived from the timer/clock module 218 for information processing activities, such as the collaborative microservices request flow control synchronization.

The database 112 is again shown within FIG. 4 associated with the core processing module 200. As such, the database 112 may be operatively coupled to the core processing module 200 without use of network connectivity, as appropriate for a given implementation.

The CPU 202, the display 204, the input device 206, the communication module 208, the memory 210, the request flow controller module 216, the timer/clock module 218, and the database 112 are interconnected via an interconnection 220. The interconnection 220 may include a system bus, a network, or any other interconnection capable of providing the respective components with suitable interconnection for the respective purpose.

Though the different modules illustrated within FIG. 4 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. Many other possible arrangements for components of the core processing module 200 are possible and all are considered within the scope of the present subject matter. It should also be understood that, though the database 112 is illustrated as a separate component for purposes of example, the information stored within the database 112 may also/ alternatively be stored within the memory 210 without departure from the scope of the present subject matter.

Accordingly, the core processing module 200 may take many forms and may be associated with many platforms.

Continuing with the description of the request flow controller that is distributed within and that is a part of each microservice, the detailed description of processing for synchronization of requests among microservices to one or more dependent services follows. As described above, each of the microservices that share a dependent service collaborate to ensure that the volume of requests to a shared dependent service do not exceed the QoS of the shared dependent service. As a result, requests do not get blocked or lost at the shared dependent service.

Figure 5:
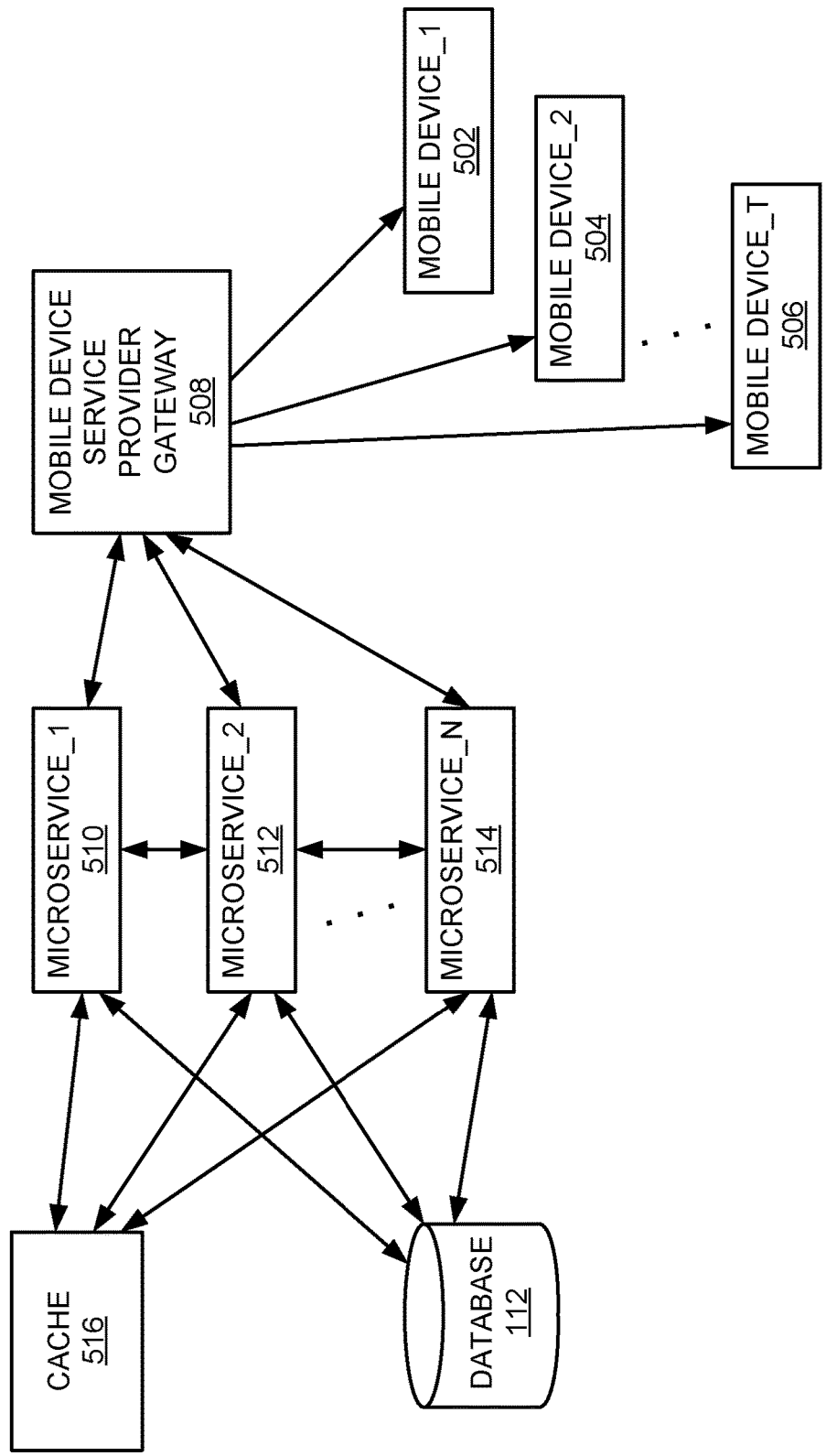
FIG. 5 is a block diagram of an example of an implementation of a system architecture that illustrates higher-level request flow details associated with collaborative microservices request flow control synchronization according to an embodiment of the present subject matter.

FIG. 5 is a block diagram of an example of an implementation of a system architecture 500 that illustrates higher-level request flow details associated with collaborative microservices request flow control synchronization. As described in more detail below, the system architecture 500 depicts a cascaded set of services for which the various components described below each have different QoS obligations within the system architecture 500.

A mobile device_1 502, a mobile device_2 504, and additional mobile devices up to a mobile device_T 506 are shown. It should be understood that the mobile devices 502 through 506 represent many more devices than are illustrated, and may include up to millions of mobile devices.

A mobile device service provider gateway 508 is illustrated and is in communication with the mobile devices 502 through 506. The mobile device service provider gateway 508 is considered a shared dependent service that is used by several microservices described below to send push notifications to the mobile devices 502 through 506. The mobile device service provider gateway 508 has a defined QoS that is fixed, and blocks any push notifications that exceed its fixed QoS. Further, the QoS of the mobile device service provider gateway 508 is considered to be lower than the request sending capabilities of the microservices (set) that share the mobile device service provider gateway 508 as a dependent service.

A microservice_1 510, a microservice_2 512, and additional microservices up to a microservice_N 514 are also shown. It is understood that the microservices 510 through 514 represent many more deployed/operational microservices than are illustrated, and may include as many deployed/operational microservices as appropriate for a given implementation (e.g., two through N microservices).

The microservices 510 through 514 perform collaborative microservices request flow control synchronization to multiple shared dependent services, as described above and in more detail below. The microservices 510 through 514 are in communication with each other, and are each in communication with the mobile device service provider gateway 508, as represented by the various double-headed arrows illustrated as interconnecting these components within FIG. 5. The microservices 510 through 514 are also shown to each be interconnected with a cache 516 and with the database 112 that is again illustrated within FIG. 5. Additional double-headed arrows are illustrated as interconnecting these respective components within FIG. 5. Within this example, each of the mobile device service provider gateway 508 and the database 112 are shared dependent services of the microservices 510 through 514. As described in more detail further below, the cache 516 stores synchronization information that is used by the microservices 510 through 514 to perform the collaborative microservices request flow control synchronization described herein.

To reduce complexity of description of the present example, the cache 516 is considered to have a QoS that matches the needs of the microservices 510 through 514 as a group/set, and the description below is provided in consideration of each read or write to the cache 516 as providing a successful read or write operation for each of the microservices 510 through 514 as a set. However, it should be understood that the details of the collaborative microservices request flow control synchronization described herein may additionally be extended to the cache 516 if the cache 516 has a lower QoS than is needed by the entire set of the microservices 510 through 514.

The database 112 provides a fixed QoS that is based upon a processing level in read operations per second that the database 112 can fulfill. Any additional requests would be blocked by the database 112. The database 112 stores mobile application (app) identifiers of one or more mobile applications, device identifiers (IDs) of all of the mobile devices 502 through 506 that have the respective mobile applications installed, and other information as appropriate for a given implementation. As a result, the database 112, that is shared among the set/group of microservices 510 through 514 as a shared dependent service, has a different/lower QoS than the request processing (database read) capabilities of the set/group of microservices 510 through 514.

Again using the push notification for purposes of example, and as described above, a push notification that is designated to be collaboratively sent by the microservices 510 through 514 to the appropriate mobile devices 502 through 506 would result in a set of database read operations to the database 112 by multiple ones of the microservices 510 through 514. As additionally described above, these backend database reads would be needed to extract stored device IDs for all of the mobile devices that have the respective mobile application installed and to which the push notification is to be sent. Further, push notifications must be sent through the mobile device service provider gateway 508 by transmission of the respective device ID and notification message for each push notification.

As a result and as noted above, each of the mobile device service provider gateway 508 and the database 112 are shared dependent services of the set of microservices 510 through 514, and as described above each of these shared dependent services has a lower QoS than the processing capabilities of the set of microservices 510 through 514. Additionally, because each of the mobile device service provider gateway 508 and the database 112 are shared dependent services of the set of microservices 510 through 514, the system architecture 500 depicts a cascaded set of services for which the set of microservices 510 through 514 synchronize requests and/or request processing. The set of microservices 510 through 514 each collaboratively map their respective requests (as a set) to the lower QoS of each of the mobile device service provider gateway 508 and the database 112 to ensure that no requests are lost. This form of request-side synchronization represents a significant improvement over conventional systems within which any requests above the QoS of a dependent service are blocked/lost. This form of request-side synchronization and management also offloads any processing required on the dependent service side to manage (e.g., block, throttle) any requests that exceed the dependent service's QoS, which reduces processor occupancy at the shared dependent service and improves throughput by the shared dependent service.

The following Example_1 shows pseudo code that represents an example of functional synchronization code that can be executed by each of the microservices 510 through 514 to perform the collaborative microservices request flow control synchronization described herein. The pseudo code of Example_1 depicts a new form of synchronized microservices processing that did not previously exist, and that can be used to implement the collaborative microservices request flow control synchronization described herein.

The logic of Example_1 is applicable to synchronize requests to the database 112, the mobile device service provider gateway 508, and to any other shared dependent cloud service, as appropriate for the given implementation. A description of portions of Example_1 follows the pseudo code itself.

```
// Assign/define maximum dependent service requests per second:
MAX_DEPENDENT_SERVICE_HANDLE_COUNT = 5
If (reqCount++ > MAX_DEPENDENT_SERVICE_HANDLE_COUNT) {
    synchronized(DependentServiceQueryThrottle.class) {
        // Synchronized dependent service request issuance throttle
        // Wait until all other responses are received, otherwise allowing new requests
        // would exceed dependent service QoS and result in error
        while (checkInCheckOutCount.get( ) != 0 ) {
            try {
                Thread.sleep(10);
            } catch (InterruptedException e) {
                e.printStackTrace( );
            }
        }
        if (dependentServiceHandleCount.incrementAndGet( ) >=
            MAX_DEPENDENT_SERVICE_HANDLE_COUNT) {
            try {
                // Sleep Minimum for 1 second (wait for existing requests to
                // pass through), otherwise would receive error from
                // dependent service
                Thread.sleep(1000);
            } catch (InterruptedException e) {
                e.printStackTrace( );
            }
            dependentServiceHandleCount = new AtomicInteger(0);
        }
    }
}
```

```
checkInCheckOutCount++
doDependentServiceQuery( )
checkInCheckOutCount--
reqCount --
```

Example 1: Dependent Service Collaborative Synchronization Logic

Within Example 1, an atomic variable called reqCount will keep track of pending requests from all collaborating/synchronizing microservices. This atomic variable is saved in a shared global cache, such as the cache 516. Saving this atomic variable within a shared global cache will ensure that the current value of the variable is accessible across all the collaborating/synchronizing microservices. As a request comes in, this reqCount variable is incremented. This variable, as a shared counter, tracks the total number of collaborating microservices dependent service requests into the dependent service's system. If the total of the requests across all collaborating microservices is less than the maximum allowed by the dependent service, which within the Example_1 is assigned/defined as five (5) requests per second, the logic can be bypassed and normal request control flow processing can be performed.

The variable dependentServiceHandleCount is a local variable. This local variable is incremented (by "dependentServiceHandleCount.incrementAndGet( )") whenever a new request comes in, and is reset to zero (0) when the request count reaches the maximum count. This dependentServiceHandleCount local variable holds the next batch of requests from any one of the collaborating microservices (again, 5 requests in Example 1) until the response of the previous batch is completed plus the duration of one (1) second is also complete (by "Thread.sleep(1000)").

The variable checkInCheckOutCount is also an atomic variable that is stored in the shared global cache (e.g., the cache 516). This variable keeps track of how many requests are being processed at any given moment across all collaborating/synchronized microservices. As such, the checkInCheckOutCount atomic variable serves as a current requests-in-process counter. The value of this variable varies between zero (0) and the defined maximum requests per second (5 request/second in Example_1). The value of the checkInCheckOutCount variable is reset to zero (0) when all requests have been processed. (e.g., when the batch of 5 requests for that second have been processed).

As can be seen from the description and example logic above, by distributing synchronization counters between local memory and shared cache memory, the collaborating microservices can synchronize all requests to a shared dependent service to ensure that the set of dependent service requests does not exceed the QoS of the dependent service (again, specified/defined as 5 requests/second in Example 1). The logic of Example_1 can be adapted based upon the teachings herein to adjust to the QoS of a dependent service, and multiple microservices can thereby adapt to synchronize requests to multiple different dependent services that have different QoS capabilities.

Figure 6:
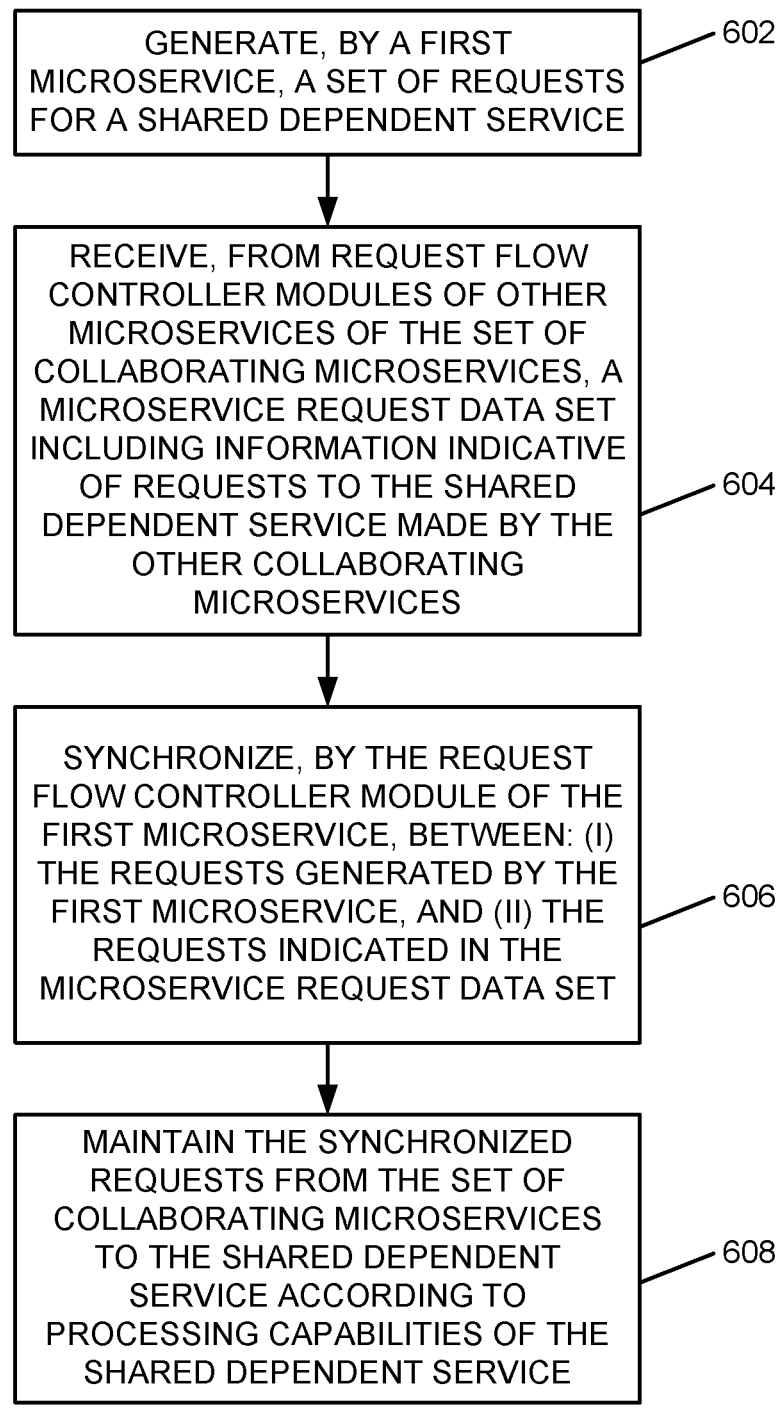
FIG. 6 is a flow chart of an example of an implementation of a process for automated collaborative microservices request flow control synchronization according to an embodiment of the present subject matter.
Figure 7:
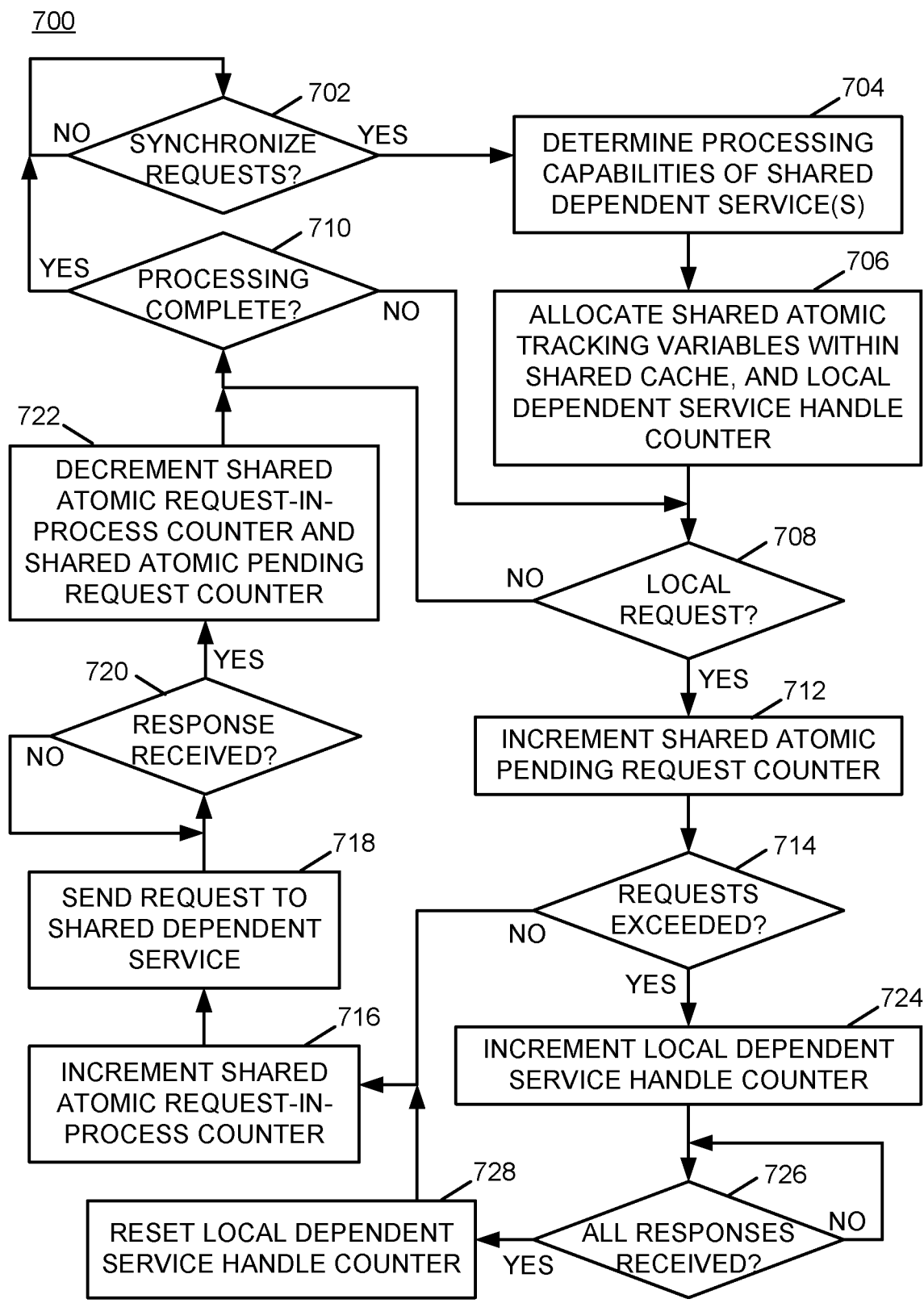
FIG. 7 is a flow chart of an example of an implementation of a process for collaborative microservices request flow control synchronization that details coordinated multi-computer operations associated with maintaining synchronized request levels at or below processing capabilities of a shared dependent service according to an embodiment of the present subject matter.

FIG. 6 through FIG. 7 described below represent example processes that may be executed by devices, such as the core processing module 200, to perform the automated collaborative microservices request flow control synchronization associated with the present subject matter. Many other variations on the example processes are possible and all are considered within the scope of the present subject matter. The example processes may be performed by modules, such as the request flow controller module 216 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 6 is a flow chart of an example of an implementation of a process 600 for automated collaborative microservices request flow control synchronization. The process 600 represents a computer-implemented method of performing the subject matter described herein. The process 600 can be performed by each of one or more processors that executes a request flow controller module of each microservice of a set of collaborating microservices. At block 602, the process 600 generates, by a first microservice, a set of requests for a shared dependent service. At block 604, the process 600 receives, from request flow controller modules of other microservices of the set of collaborating microservices, a microservice request data set including information indicative of requests to the shared dependent service made by the other collaborating microservices. At block 606, the process 600 synchronizes, by the request flow controller module of the first microservice, between: (i) the requests generated by the first microservice, and (ii) the requests indicated in the microservice request data set. At block 608, the process 600 maintains the synchronized requests from the set of collaborating microservices to the shared dependent service according to processing capabilities of the shared dependent service.

FIG. 7 is a flow chart of an example of an implementation of a process 700 for collaborative microservices request flow control synchronization that details coordinated multi-computer operations associated with maintaining synchronized request levels at or below processing capabilities of a shared dependent service. The process 700 represents a computer-implemented method of performing the subject matter described herein. The process 700 further represents processing performed by a request flow controller module, such as the request flow controller module 216, associated with each microservice of a set of collaborating microservices that share a dependent service. Additionally, software can be provided as a service in a cloud environment to provision the request flow controller modules of a set of collaborating microservices.

At decision point 702, the process 700 makes a determination as to whether to begin synchronized request processing with other microservices of the set of collaborating microservices. As described above, synchronizing of requests from the set of collaborating microservices to the shared dependent service can be performed between/among the request flow controller modules of each microservice that executes the process 700.

In response to determining to begin synchronized request processing at decision point 702, the process 700 determines, at block 704, processing capabilities of one or more shared dependent services to which requests are to be synchronized among a set of collaborating microservices. The processing capabilities of the shared dependent service include a published quality of service (QoS) of the shared dependent service. The QoS of the shared dependent service includes a level of request throughput processing beyond which any additional requests to the shared dependent service will be blocked by the shared dependent service. For example, the process 700 may determine QoS levels of each dependent service, such as the database 112 and the mobile device service provider gateway 508. Further, the QoS may be specified as number of queries per second for the database 112, a number of requests per rate agreement to be sent to mobile devices by the mobile device service provider gateway 508, or other QoS as appropriate for a given implementation. It should be noted that for purposes of the present example, the processing capabilities (QoS) of the shared dependent service are/is lower than query/request generation capabilities of the set of collaborating microservices.

It should also be noted that the process 700 illustrates detailed processing after block 704 that applies to each shared dependent service for which request flow control operations are to be performed. As such, the processing depicted and described details synchronized processing to control request flows to a single shared dependent service with the understanding that the detailed synchronization processing applies to each shared dependent service and may be performed by parallel computer processing.

At block 706, the process 700 allocates shared atomic tracking variables within a shared cache that is accessible/accessed by each collaborating microservice, and allocates a local dependent service handle counter variable. The shared atomic tracking variables include a shared atomic pending request counter (e.g., reqCount described above) and a shared atomic request-in-process counter (e.g., checkInCheckOutCount described above), and these shared atomic variables can be stored in a cache such as the cache 516. An example of the local dependent service handle counter variable is "dependentServiceHandleCount" described above. As such, the process 700 maintains, in collaboration with the other microservices of the set of collaborating microservices, a shared atomic pending request counter and a shared atomic request-in-process counter within a shared cache. The shared atomic pending request tracks issued requests from the set of collaborating microservices to the shared dependent service, and the shared atomic request-in-process counter tracks processing of requests by the shared dependent service. Again, a set of the shared atomic tracking variables and the local dependent service handle counter variable are allocated for each shared dependent service.

At decision point 708, the process 700 begins iterative processing by making a determination as to whether a local request is available to be issued to the shared dependent service. In response to determining that a local request is not available to be issued to the shared dependent service, the process 700 makes a determination at decision point 710 as to whether synchronized processing is completed. In response to determining at decision point 710 that synchronized processing is not completed, the process 700 returns to decision point 708, and iterates as described above.

In response to determining at decision point 708 that a local request is available to be issued to the shared dependent service, the process 700 increments the shared atomic pending request counter at block 712. At decision point 714, the process 700 determines whether the current pending requests from all collaborating microservices exceed the processing capabilities of the shared dependent service. The requests may be queries, messages to be delivered to other mobile devices, or other forms of requests as appropriate for a given implementation. A description of synchronized processing under conditions of the current pending requests from all collaborating microservices exceeding the processing capabilities of the shared dependent service will be described in more detail further below.

As such, in response to determining at decision point 714 that the current pending request count across all of the set of collaborating microservices to the shared dependent service, as represented by a value of the shared atomic pending request counter, do not exceed (e.g., are lower than) the processing capabilities of the shared dependent service, the process 700 begins processing to bypass request flow control processing. At block 716, the process 700 increments the shared atomic request-in-process counter. At block 718, the process 700 sends the request to the shared dependent service.

At decision point 720, the process 700 makes a determination regarding whether a response to the request has been received from the shared dependent service. For example, where the request is a query to a database, query results can be received from the database. Where the request is a request to send a message to a mobile device, an acknowledgement can be received.

In response to determining at decision point 720 that the response has been received from the shared dependent service, the process 700 decrements the shared atomic request-in-process counter and the shared atomic pending request counter at block 722. Decrementing the shared atomic request-in-process counter and the shared atomic pending request counter notifies the other microservices of the set of collaborating microservices that the current request has been completed. The process 700 returns to decision point 710 and iterates as described above.

Returning to the description of decision point 714, in response to determining at decision point 714 that the current pending requests from all collaborating microservices exceed the processing capabilities (e.g., QoS) of the shared dependent service, the process 700 begins synchronized flow control processing. At block 724, the process 700 increments the local dependent service handle counter.

At decision point 726, the process 700 waits and makes a determination as to whether all responses to other/outstanding microservice requests from the set of collaborating microservices have been completed. This processing is again performed by use of the shared atomic request-in-process counter and the shared atomic pending request counter. The process 700 holds additional requests to the shared dependent service in response to determining that current requests from the set of collaborating microservices to the shared dependent service, as represented by a value of the shared atomic pending request counter, has reached a maximum according to the processing capabilities of the shared dependent service.

In response to determining at decision point 726 that all responses to other/outstanding microservice requests from the set of collaborating microservices have been completed, as represented by a current value of the shared atomic request-in-process counter, the process 700 resets the local dependent service handle counter at block 728 and proceeds to block 716 to issue/send the request to the shared dependent service, as described above. As such, the process 700 issues any additional requests to the shared dependent service in response to completion of processing, as represented by a value of the shared atomic request-in-process counter, of the current requests by the shared dependent service. The completion of processing of the current requests by the shared dependent service can include completion of processing by the set of microservices of responses to the current requests received from the shared dependent service, as appropriate for a given implementation.

Processing continues to synchronize requests among the set of collaborating microservices to the shared dependent service until processing of all requests has been completed. As such, in response to determining at decision point 710 that processing has been completed, the process 700 returns to decision point 702 and iterates as described above.

As such, the process 700 synchronizes requests from a set of collaborating microservices to a shared dependent service. The process 700 operates to maintain the synchronized requests from the set of collaborating microservices to the shared dependent service according to processing capabilities of the shared dependent service.

Some embodiments of the present invention may improve the technology of computers in one, or more, of the following ways: (i) maximizing query/request throughput by a computer that executes/provides a shared dependent service by eliminating blocked/lost requests; (ii) increasing processing speed of queries/requests by a computer that executes/provides a shared dependent service by ensuring that each query/requests is processed at an earliest possible time; (iii) and increasing network bandwidth usage efficiency between computers by reducing retransmissions of queries/requests that would otherwise be blocked/lost by conventional computers.

The present invention is not abstract because it relates particularly to computer operations and/or hardware for reasons that may include the following: (i) it improves throughput across sets of computers that execute multiple microservices without losing requests that would otherwise be blocked/lost due to conventional query/request processing technologies; (ii) it guarantees delivery of messages that would be blocked/lost in conventional computing platforms; and (iii) it increases computer processing efficiency because computer processing bandwidth is devoted to query/request processing rather than query/request retransmission processing that conventionally decreased computer processing efficiency.

As described above in association with FIG. 1 through FIG. 7, the example systems and processes provide collaborative microservices request flow control synchronization. Many other variations and additional activities associated with collaborative microservices request flow control synchronization are possible and all are considered within the scope of the present subject matter.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art based upon the teachings herein without departing from the scope and spirit of the invention. The subject matter was described to explain the principles of the invention and the practical application, and to enable others of ordinary skill in the art to understand the invention for various embodiments with various modifications as are suited to the particular use contemplated.

What is claimed is:

1. A computer-implemented method for collaboratively synchronizing request flows across microservices of a cloud computing environment to meet quality of service (QoS) provisions of a shared dependent service, the computer-implemented method comprising:
    by a processor that executes a request flow controller module of a first microservice of a set of collaborating microservices:
        generating, by the first microservice, a plurality of requests for a shared dependent service, wherein the QoS provisions for processing the plurality of requests by the shared dependent service are fixed and lower than QoS provisions for generating the plurality of requests by the first microservice;
        receiving, from request flow controller modules of other microservices of the set of collaborating microservices, a microservice request data set including information indicative of requests to the shared dependent service made by the other collaborating microservices;
        distributing synchronization counters between local memory of the request flow controller module of the first microservice and a shared global cache, said synchronization counters tracking a number of requests being processed at a given moment across the set of collaborating microservices by the shared dependent service;
        upon determining that the number of requests being processed exceed QoS provisions of the shared dependent service for processing the number of requests across the set of collaborating microservices, synchronizing, by the request flow controller module of the first microservice, the requests generated by the first microservice, with the requests indicated in the microservice request data set, by collaboratively mapping the microservice request data set and the plurality of requests from the first microservice to the QoS provisions of the shared dependent service, as a set; and
        maintaining the synchronized requests from the set of collaborating microservices to the shared dependent service according to the QoS provisions of the shared dependent service.

2. The computer-implemented method of claim 1, where:
the QoS provisions of the shared dependent service comprises a level of request throughput processing beyond which any additional requests to the shared dependent service will be blocked by the shared dependent service.

3. The computer-implemented method of claim 1, further comprising the request flow controller module of the first microservice as executed by the processor:
    maintaining, in collaboration with the other microservices of the set of collaborating microservices, a shared atomic pending request counter and a shared atomic request-in-process counter within the shared global cache, where the shared atomic pending request counter tracks issued requests from the set of collaborating microservices to the shared dependent service, and the shared atomic request-in-process counter tracks processing of requests by the shared dependent service.

4. The computer-implemented method of claim 1, further comprising the request flow controller module of the first microservice as executed by the processor bypassing request flow control processing in response to determining that a current shared pending request count across all of the set of collaborating microservices to the shared dependent service, as represented by a value of a shared atomic pending request counter, is lower than the processing capabilities of the shared dependent service.

5. The computer-implemented method of claim 1, further comprising the request flow controller module of the first microservice as executed by the processor:
holding additional requests to the shared dependent service in response to determining that current requests from the set of collaborating microservices to the shared dependent service, as represented by a value of a shared atomic pending request counter, has reached a maximum according to the processing capabilities of the shared dependent service; and
issuing the additional requests to the shared dependent service in response to completion of processing, as represented by a value of a shared atomic request-in-process counter, of the current requests by the shared dependent service.

6. The computer-implemented method of claim 1, where software is provided as a service in the cloud environment to provision the request flow controller modules of the set of collaborating microservices.

7. The computer-implemented method of claim 1, wherein the shared dependent service is a mobile device service provider gateway used by the set of collaborating microservices to send push notifications to a plurality of mobile devices, the QoS provisions of the shared dependent service fixes a number of push notifications and the mobile service provider gateway blocks any requests to send push notifications that exceed the number of push notifications defined by the QoS provisions.

8. The computer-implemented method of claim 7, further comprising:
requesting, by the collaborating microservices, a plurality of read operations of a database to extract stored device IDs for each of the plurality of mobile devices receiving the push notifications, wherein said database has a fixed QoS for performing the plurality of read operations that are less than request processing capabilities of the collaborating microservices; and
further collaboratively mapping by the collaborating microservices, the plurality of read operations of the database to the fixed QoS of the database.

9. A system for collaboratively synchronizing request flows across microservices of a cloud computing environment to meet quality of service (QoS) provisions of a shared dependent service, the system comprising:
a communication module; and
a processor, that executes a request flow controller module of a first microservice of a set of collaborating microservices, programmed to:
generate, by the first microservice, a plurality of requests for a shared dependent service, wherein the QoS provisions for processing the plurality of requests by the shared dependent service are fixed and lower than QoS provisions for generating the plurality of requests by the first microservice;
receive, from request flow controller modules of other microservices of the set of collaborating microservices, a microservice request data set including information indicative of requests to the shared dependent service made by the other collaborating microservices;
distribute synchronization counters between local memory of the request flow controller module of the first microservice and a shared global cache, said synchronization counters tracking a number of requests being processed at a given moment across the set of collaborating microservices by the shared dependent service;
upon determining that the number of requests being processed exceed QoS provisions of the shared dependent service for processing the number of requests across the set of collaborating microservices, synchronize, via the communication module by the request flow controller module of the first microservice, the requests generated by the first microservice, with the requests indicated in the microservice request data set, by collaboratively mapping the microservice request data set and the plurality of requests from the first microservice to the QoS provisions of the shared dependent service, as a set; and
maintain the synchronized requests from the set of collaborating microservices to the shared dependent service according to the QoS provisions of the shared dependent service.

10. The system of claim 9, where:
the QoS provisions of the shared dependent service comprises a level of request throughput processing beyond which any additional requests to the shared dependent service will be blocked by the shared dependent service.

11. The system of claim 9, where the processor of the request flow controller module of the first micro service is further programmed to:
maintain, in collaboration with the other microservices of the set of collaborating microservices, a shared atomic pending request counter and a shared atomic request-in-process counter within a shared cache, where the shared atomic pending request counter tracks issued requests from the set of collaborating microservices to the shared dependent service, and the shared atomic request-in-process counter tracks processing of requests by the shared dependent service.

12. The system of claim 9, where the processor of the request flow controller module of the first microservice is further programmed to bypass request flow control processing in response to determining that a current shared pending request count across all of the set of collaborating microservices to the shared dependent service, as represented by a value of a shared atomic pending request counter, is lower than the processing capabilities of the shared dependent service.

13. The system of claim 9, where the processor of the request flow controller module of the first micro service is further programmed to:
hold additional requests to the shared dependent service in response to determining that current requests from the set of collaborating microservices to the shared dependent service, as represented by a value of a shared atomic pending request counter, has reached a maximum according to the processing capabilities of the shared dependent service; and
issue the additional requests to the shared dependent service in response to completion of processing, as represented by a value of a shared atomic request-in-process counter, of the current requests by the shared dependent service.

14. The system of claim 9, wherein the shared dependent service is a mobile device service provider gateway configured to send push notifications requested by the set of collaborating microservices to a plurality of mobile devices, the QoS provisions of the shared dependent service fixes a number of push notifications to be sent and the mobile service provider gateway blocks any requests to send push notifications that exceed the number of push notifications defined by the QoS provisions of the shared dependent service.

15. A computer program product for collaboratively synchronizing request flows across microservices of a cloud computing environment to meet quality of service (QoS) provisions of a shared dependent service, the computer program product comprising:
a computer readable storage medium having computer readable program code embodied therewith, where the computer readable storage medium is not a transitory signal per se and where the computer readable program code when executed on a computer that executes a request flow controller module of a first microservice of a set of collaborating microservices causes the computer to:
generate, by the first microservice, a plurality of requests for a shared dependent service, wherein the QoS provisions for processing the plurality of requests by the shared dependent service are fixed and lower than QoS provisions for generating the plurality of requests by the first microservice;
receive, from request flow controller modules of other microservices of the set of collaborating microservices, a microservice request data set including information indicative of requests to the shared dependent service made by the other collaborating microservices;
distribute synchronization counters between local memory of the request flow controller module of the first microservice and a shared global cache, said synchronization counters tracking a number of requests being processed at a given moment across the set of collaborating microservices by the shared dependent service;
upon determining that the number of requests being processed exceed QoS provisions of the shared dependent service for processing the number of requests across the set of collaborating microservices, synchronize, by the request flow controller module of the first microservice, the requests generated by the first microservice, with the requests indicated in the microservice request data set, by collaboratively mapping the microservice request data set and the plurality of requests from the first microservice to the QoS provisions of the shared dependent service, as a set; and
maintain the synchronized requests from the set of collaborating microservices to the shared dependent service according to the QoS provisions of the shared dependent service.

16. The computer program product of claim 15, where:
the QoS provisions of the shared dependent service comprises a level of request throughput processing beyond which any additional requests to the shared dependent service will be blocked by the shared dependent service.

17. The computer program product of claim 15, where the computer readable program code when executed on the computer that executes the request flow controller module of the first microservice further causes the computer to:
maintain, in collaboration with the other microservices of the set of collaborating microservices, a shared atomic pending request counter and a shared atomic request-in-process counter within a shared cache, where the shared atomic pending request counter tracks issued requests from the set of collaborating microservices to the shared dependent service, and the shared atomic request-in-process counter tracks processing of requests by the shared dependent service.

18. The computer program product of claim 15, where the computer readable program code when executed on the computer that executes the request flow controller module of the first microservice further causes the computer to bypass request flow control processing in response to determining that a current shared pending request count across all of the set of collaborating microservices to the shared dependent service, as represented by a value of a shared atomic pending request counter, is lower than the processing capabilities of the shared dependent service.

19. The computer program product of claim 15, where the computer readable program code when executed on the computer that executes the request flow controller module of the first microservice further causes the computer to:
hold additional requests to the shared dependent service in response to determining that current requests from the set of collaborating microservices to the shared dependent service, as represented by a value of a shared atomic pending request counter, has reached a maximum according to the processing capabilities of the shared dependent service; and
issue the additional requests to the shared dependent service in response to completion of processing, as represented by a value of a shared atomic request-in-process counter, of the current requests by the shared dependent service.

20. The computer program product of claim 15, where software is provided as a service in the cloud environment to provision the request flow controller modules of the set of collaborating microservices.

* * * * *